United States Patent
Xu et al.

(10) Patent No.: US 12,101,732 B2
(45) Date of Patent: Sep. 24, 2024

(54) METHOD FOR CONFIGURING USER EQUIPMENT POLICY, NETWORK DEVICE AND TERMINAL DEVICE THEREOF

(71) Applicant: GUANGDONG OPPO MOBILE TELECOMMUNICATIONS CORP., LTD., Guangdong (CN)

(72) Inventors: Yang Xu, Dongguan (CN); Haorui Yang, Dongguan (CN); Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 324 days.

(21) Appl. No.: 17/456,311

(22) Filed: Nov. 23, 2021

(65) Prior Publication Data

US 2022/0167299 A1   May 26, 2022

Related U.S. Application Data

(63) Continuation of application No. PCT/CN2019/108754, filed on Sep. 27, 2019.

(30) Foreign Application Priority Data

Aug. 12, 2019 (WO) ................ PCT/CN2019/100277

(51) Int. Cl.
*H04W 60/04* (2009.01)
*H04M 15/00* (2006.01)
*H04W 84/04* (2009.01)

(52) U.S. Cl.
CPC ........... *H04W 60/04* (2013.01); *H04M 15/66* (2013.01); *H04W 84/042* (2013.01)

(58) Field of Classification Search
CPC ... H04W 60/00; H04W 60/04; H04W 84/042; H04M 15/66
See application file for complete search history.

(56) References Cited

U.S. PATENT DOCUMENTS

2019/0174449 A1   6/2019 Shan et al.
2019/0246335 A1*  8/2019 Mukherjee ............ H04W 48/08
(Continued)

FOREIGN PATENT DOCUMENTS

CN   109155909 A   1/2019
CN   109561427 A   4/2019
(Continued)

OTHER PUBLICATIONS

3rd Generation Partnership Project "Technical Specification Group Services and System Aspects", 3GPP TS 23.502, V16.1.1 (Jun. 2019). 495 pages.
(Continued)

*Primary Examiner* — Jeong S Park
(74) *Attorney, Agent, or Firm* — PERKINS COIE LLP

(57) ABSTRACT

Disclosed in the present invention are a policy configuration method, a terminal device, a network device, a chip, a computer readable storage medium, a computer program product, and a computer program. The method comprises: a terminal device receives a User Equipment (UE) policy sent by a network device, the UE policy being used by the terminal device when the terminal device is registered at a non-public network, wherein a policy identifier of the UE policy comprises an identifier of the non-public network.

20 Claims, 12 Drawing Sheets

(56) References Cited

U.S. PATENT DOCUMENTS

| | | | |
|---|---|---|---|
| 2019/0313359 A1* | 10/2019 | Lee | H04W 76/14 |
| 2021/0029253 A1* | 1/2021 | Xu | H04M 15/61 |
| 2021/0037380 A1* | 2/2021 | Lee | H04W 12/69 |
| 2021/0037449 A1* | 2/2021 | Bleidorn | H04L 41/0806 |
| 2021/0297937 A1* | 9/2021 | Baek | H04W 48/12 |
| 2022/0240147 A1* | 7/2022 | Wolfner | H04W 36/0022 |
| 2022/0272620 A1* | 8/2022 | Ninglekhu | H04W 48/18 |

FOREIGN PATENT DOCUMENTS

| | | | | |
|---|---|---|---|---|
| CN | 109862581 A | | 6/2019 | |
| CN | 109982415 A | | 7/2019 | |
| EP | 3846579 A1 | * | 7/2021 | ......... H04L 12/1407 |
| WO | 2018138379 A1 | | 8/2018 | |
| WO | 2019096418 A1 | | 5/2019 | |

OTHER PUBLICATIONS

Extended European Search Report of the European application No. 19941661.1, issued on Jun. 1, 2022. 14 pages.

First Office Action of the Chinese application No. 202110447245.9, issued on May 25, 2022. 23 pages with English Translation.

Vivo et al. "IIntroducing QoS differentation for access to PLMN services via non-public networks and vice versa_option2" S2-1903238; 3GPP TSG-SA2 Meeting #132; Xi'an, China, Apr. 8-12, 2019. 3 pages.

3GPP TR 23.734 V0.3.0 (Oct. 2018), 3rd Generation Partnership Project; Technical Specification Group Services and System Aspects, Study on 5GS Enhanced support of Vertical and LAN Services, (Release 16).

Qualcomm Incorporated, Ericsson, Nokia, Nokia Shanghai Bell, Contents of UE policy container and processing of UE policy sections, 3GPP TSG-CT WG1 Meeting #111, C1-183831, Osaka (Japan), May 21-25, 2018 (was C1-183797).

International Search Report Mailed May 9, 2020 In Application No. PCT/CN2019/108754.

International Search Report Mailed May 9, 2020 In Application No. PCT/CN2019/100277.

Examination Report for European Application No. 19941661.1 issued Apr. 3, 2023. 17 pages.

Second Office Action for Chinese Application No. 202110447245.9 issued Feb. 3, 2023. 7 pages with English translation.

Second Office Action of the European application No. 19941661.1, issued on Sep. 22, 2023. 8 pages.

* cited by examiner

A terminal equipment receives a User Equipment (UE) policy sent by a network equipment, wherein the UE policy is used when the terminal equipment registers in a non-public network

21

A network equipment sends a User Equipment (UE) policy to a terminal equipment, wherein the UE policy is used when the terminal equipment registers in a non-public network

31

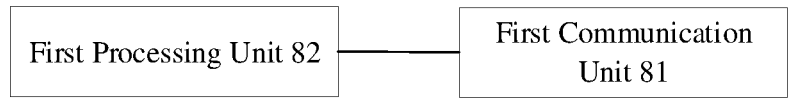
FIG. 11
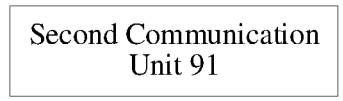
FIG. 12
A terminal equipment receives a UE policy sent by a network equipment
FIG. 13A
A network equipment sends a UE policy to a terminal equipment
FIG. 13B A terminal equipment carries a fifth indication in a container of a registration request message  1301

A network equipment receives a fifth indication carried in a container of a registration request message sent by a terminal equipment  1401

METHOD FOR CONFIGURING USER EQUIPMENT POLICY, NETWORK DEVICE AND TERMINAL DEVICE THEREOF

CROSS-REFERENCE TO RELATED APPLICATION

This application is a continuation application of International Application No. PCT/CN2019/108754 filed on Sep. 27, 2019, which claims the priority to International Application No. PCT/CN2019/100277 filed on Aug. 12, 2019, and the entire disclosures of both applications are hereby incorporated by reference.

TECHNICAL FIELD

The present disclosure relates to the technical field of information processing, in particular to a policy configuration method, a network equipment, a terminal equipment, a chip, a computer readable storage medium, a computer program product and a computer program.

BACKGROUND

At present, parameters of a UE (User Equipment) policy are distinguished by a PSI (Policy Section Identity) of the UE policy, PSI=PLMN ID+PSC, herein the PLMN ID is a Public Land Mobile Network Identifier and the PSC is a Policy Section Code, that is, the terminal knows which PLMNs are corresponding to the UE policy and uses them when registering in the corresponding PLMN. However, in a scenario of a non-public network, the network is not distinguished by PLMN, therefore the terminal equipment cannot know the UE policy corresponding to the non-public network. In this case, a mechanism of extending the existing UE policy is needed to solve this problem.

SUMMARY

In order to solve the above technical problems, implementations of the present disclosure provide a policy configuration method, a network equipment, a terminal equipment, a chip, a computer readable storage medium, a computer program product and a computer program.

In a first aspect, there is provided a policy configuration method, including:

a terminal equipment receives a User Equipment (UE) policy sent by a network equipment, wherein the UE policy is used when the terminal equipment registers in a non-public network;

wherein a policy identifier of the UE policy contains an identifier of the non-public network.

In a second aspect, there is provided a policy configuration method, including:

a network equipment sends a user equipment (UE) policy to a terminal equipment, wherein the UE policy is used when the terminal equipment registers in a non-public network;

wherein a policy identifier of the UE policy contains an identifier of the non-public network.

In a third aspect, there is provided a policy configuration method, including:

a terminal equipment sends a policy request message to a network equipment, wherein the terminal equipment is located in a non-public network, and the policy request message is configured to request a UE policy required to be used in the non-public network; and receiving the UE policy sent by a network equipment for the non-public network where the terminal equipment is located.

In a fourth aspect, there is provided a policy configuration method, including:

a network equipment receives a policy request message sent by a terminal equipment, wherein the terminal equipment is located in a non-public network, and the policy request message is configured to request a UE policy that the terminal equipment needs to use in the non-public network; and sending to the terminal equipment the UE policy for the non-public network where the terminal equipment is located.

In a fifth aspect, there is provided a policy configuration method, including:

a terminal equipment receives a UE policy sent by a network equipment; and if a value of a PLMN ID of a PSI in the UE policy is a specific value, it is determined that the UE policy is a UE policy suitable for a non-public network under a PLMN.

In a sixth aspect, there is provided a policy configuration method, including:

a network equipment sends a UE policy to a terminal equipment;

wherein the UE policy is a UE policy suitable for a non-public network under a PLMN when a value of a PLMN ID of a PSI in the UE policy is a specific value.

In a seventh aspect, there is provided a terminal equipment, including:

a first communication unit configured to receive a user equipment (UE) policy sent by a network equipment, wherein the UE policy is used when the terminal equipment registers in a non-public network;

wherein a policy identifier of the UE policy includes an identifier of the non-public network.

In an eighth aspect, there is provided a network equipment, including:

a second communication unit configured to send a user equipment (UE) policy to the terminal equipment, wherein the UE policy is used when the terminal equipment registers in a non-public network;

wherein a policy identifier of the UE policy includes an identifier of the non-public network.

In a ninth aspect, there is provided a terminal equipment, including:

a first communication unit configured to send a policy request message to a network equipment, wherein the terminal equipment is located in a non-public network, and the policy request message is used for requesting a UE policy required to be used in the non-public network; and receive the UE policy sent by the network equipment for the non-public network where the terminal equipment is located.

In a tenth aspect, there is provided a network equipment, including:

a second communication unit configured to receive a policy request message sent by a terminal equipment, wherein the terminal equipment is located in a non-public network, and the policy request message is configured to request a UE policy required to be used by a terminal equipment in the non-public network; and send the UE policy for the non-public network where the terminal equipment is located.

In a eleventh aspect, there is provided a terminal equipment, including:

a first communication unit configured to receive a UE policy sent by a network equipment; and a first processing unit configured to determine that the UE policy is a UE policy suitable for a non-public network under a PLMN if a value of a PLMN ID of a PSI in the UE policy is a specific value.

In a twelfth aspect, there is provided a network equipment, including:

a second communication unit configured to send a UE policy to a terminal equipment;

wherein the UE policy is a UE policy suitable for a non-public network under a PLMN when a value of a PLMN ID of a PSI in the UE policy is a specific value.

In a thirteenth aspect, there is provided a policy configuration method, including:

a terminal equipment receives a UE policy sent by a network equipment, wherein the UE policy is applied to a non-public network.

In a fourteenth aspect, there is provided a policy configuration method, including:

a network equipment sends a UE policy to a terminal equipment, wherein the UE policy is applied to a non-public network.

In a fifteenth aspect, there is provided a terminal equipment, including:

a first communication unit configured to receive a UE policy sent by a network equipment, wherein the UE policy is applied to a non-public network.

In a sixteenth aspect, there is provided a network equipment, including:

a second communication unit configured to send a UE policy to a terminal equipment, wherein the UE policy is applied to a non-public network.

In a seventeenth aspect, there is provided a terminal equipment, including a processor and a memory. The memory is configured to store a computer program, and the processor is configured to call and run the computer program stored in the memory to perform the method in any one of the above first, third and fifth aspects or in any one of the various implementations thereof.

In an eighteenth aspect, there is provided a user equipment, including a processor and a memory. The memory is configured to store a computer program, and the processor is configured to call and run the computer program stored in the memory to perform the method in any one of the above second, fourth and sixth aspects or in any one of the various implementations thereof.

In a nineteenth aspect, there is provided a chip configured to implementing the method in any one of the above implementations.

Specifically, the chip includes a processor configured to call and run a computer program from a memory, cause an equipment equipped with the chip to perform the method in any one of the above first to sixth aspects or in any one of the various implementations of the above first to sixth aspects.

In a twentieth aspect, there is provided a computer-readable storage medium configured to store a computer program that enables a computer to perform the method in any one of the above first to sixth aspects or in any one of the various implementations of the above first to sixth aspects.

In a twenty-first aspect, there is provided a computer program product including computer program instructions that enable a computer to perform the method in any one of the above first to sixth aspects or in any one of the various implementations of the above first to sixth aspects.

In a twenty-second aspect, there is provided a computer program, when running on a computer, enables the computer to perform any one of the above first to sixth aspects or in any one of the various implementations of the above first to sixth aspects.

By adopting the above solution, the identifier of the non-public network can be contained in the policy identifier of the UE policy, such that the terminal equipment can distinguish which UE policies are for non-public networks, and thus these UE policies can be used when the UE registers in the corresponding non-public networks. In this way, the processing of configuring the UE policy corresponding to the non-public network for the terminal equipment is implemented.

BRIEF DESCRIPTION OF DRAWINGS

FIG. 11 is a schematic diagram of structural composition of a terminal equipment provided by an implementation of the present disclosure;

FIG. 12 is a schematic diagram of structural composition of a network equipment provided by an implementation of the present disclosure;

FIG. 13A is a tenth schematic flow chart of a policy configuration method provided by an implementation of the present disclosure;

FIG. 13B is an eleventh schematic flow chart of a policy configuration method provided by an implementation of the present disclosure;

DETAILED DESCRIPTION

In order to achieve a more detailed understanding of features and technical contents of implementations of the present disclosure, implementation modes of the implementations of the present disclosure will be described in detail below with reference to accompanying drawings, and the accompanying drawings are used for reference only and are not intended to limit the implementations of the present disclosure.

The technical solution in implementations of the present application will be described below with reference to the drawings in implementations of the present application. It is apparent that the implementations described are only some implementations of the present application, but not all implementations of the present application. Based on the implementations of the present application, all other implementations achieved by a person of ordinary skill in the art without paying an inventive effort are within the protection scope of the present application.

The technical solutions of the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, or the like.

Figures 1, 2, 3:
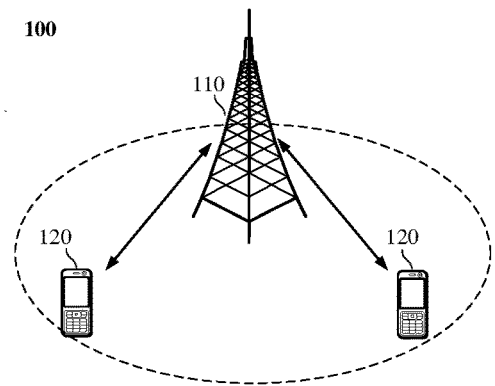
FIG. 1 is a first schematic diagram of an architecture of a communication system provided by an implementation of the present application.
FIG. 2 is a first schematic flow chart of a policy configuration method provided by an implementation of the present disclosure.
FIG. 3 is a second schematic flow chart of a policy configuration method provided by an implementation of the present disclosure.

Illustratively, a communication system 100 applied in an implementation of the present application is shown in FIG. 1. The communication system 100 may include a network equipment 110, wherein the network equipment 110 may be an equipment that communicates with a UE 120 (or referred to as a communication terminal, or a terminal). The network equipment 110 may provide communication coverage for a specific geographical area, and may communicate with UE located within the coverage area. Optionally, the network equipment 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network equipment may be a network side device in a mobile switch center, a relay station, an access point, a vehicle-mounted device, a wearable device, a hub, a switch, a bridge, a router, or a 5G network, or a network equipment in a future evolved Public Land Mobile Network (PLMN), etc.

The communication system 100 further includes at least one UE 120 located within the coverage range of the network equipment 110. As used herein, the term "UE" includes, but is not limited to, a device configured to connect via a wired circuit, for example, via a Public Switched Telephone Network (PSTN), a Digital Subscriber Line (DSL), a digital cable, a direct cable; and/or via another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or via another UE, and configured to receive/send a communication signal; and/or an Internet of Things (IoT) device. A UE configured to communicate via a wireless interface may be referred to as a "wireless communication terminal", a "wireless terminal" or a "mobile terminal".

Optionally, a terminal direct connection (Device to Device, D2D) communication may be performed between the UEs 120.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

In order to achieve a more detailed understanding of features and technical contents of implementations of the present disclosure, implementation modes of the implementations of the present disclosure will be described in detail below with reference to accompanying drawings, and the accompanying drawings are used for reference only and are not intended to limit the implementations of the present disclosure.

As shown in FIG. 2, an implementation of the present disclosure provides a policy configuration method, including the act 21.

Act 21: a terminal equipment receives a User Equipment (UE) policy sent by a network equipment, wherein the UE policy is used when the terminal equipment registers in a non-public network;

wherein a policy identifier of the UE policy contains an identifier of the non-public network.

Accordingly, as shown in FIG. 3, the present implementation further provides a policy configuration method, including the act 31.

Act 31: a network equipment sends a User Equipment (UE) policy to a terminal equipment, wherein the UE policy is used when the terminal equipment registers in a non-public network;

wherein a policy identifier of the UE policy contains an identifier of the non-public network.

Here, the network equipment may be a core network equipment at the network side, such as a Policy Control Function (PCF) entity, or an Access and Mobility Management Function (AMF) entity. It should be understood that the aforementioned network equipment for sending UE policies is only an example, which may not be limited to it in the actual practice. For example, the network equipment may also include an Access Network Discovery and Selection Function (ANDSF) entity, which may also be used for sending a UE policy, and which is not exhaustive in the present implementation.

In the present implementation, the UE policy may include an Access Network Discovery Selection Policy (ANDSP), a User Equipment Routing Selection Policy (URSP), a Vehicle-to-Everything (V2X) policy, etc.

The ANDSP policy may include a WLAN selection policy and a N3IWF (Non-3GPP InterWorking Function)/ePDG (Evolved Packet Data Gateway) selection policy. The WLAN selection policy is mainly used for the UE to select, according to this policy, a SSID (Service Set Identifier) access point and/or N3IWF/ePDG/N3AN (Non-3GPP Access Network) node selection policy.

The URSP policy may contain multiple URSP Rules, wherein each rule is composed of a Traffic Descriptor and a set of RSDs (Relative Standard Deviations), and is used for binding a specific application data stream (which is described by the Traffic Descriptor) to a session with a specified characteristics to transmit the data stream, wherein the specified characteristics may include DNN (Data Network Name), IP (Internet Protocol) address, service continuity mode, network slice parameter, non-seamless handover indicator, session type, etc. In addition, the URSP policy rules can further define conditions of coming into effect, for example, a certain policy can only become effective at a specified time or location.

The Vehicle-to-Everything (V2X) policy is divided into a PC5 policy and a Uu interface policy. The PC5 policy mainly specifies how to configure a policy for a specific service (which is described by a Provider Service Identifier (PSID) or Intelligent Transport Systems Application Object Identifiers (ITS-AIDs) for example) on a specific wireless resource (such as NR or LTE standard, frequency band selection, etc.) of a specified SideLink. In addition, it is also feasible to specify a geographical limit for data transmission via a PC5 interface, and whether the policy is customized by the operator, etc.

The Uu interface policy is to transmit a specific service (which is described by a PSID or ITS-AID for example) on a session with a specified characteristic, and the policy can also become effective under a specific geographical or time condition (somewhat similar to the URSP policy).

Figure 4:
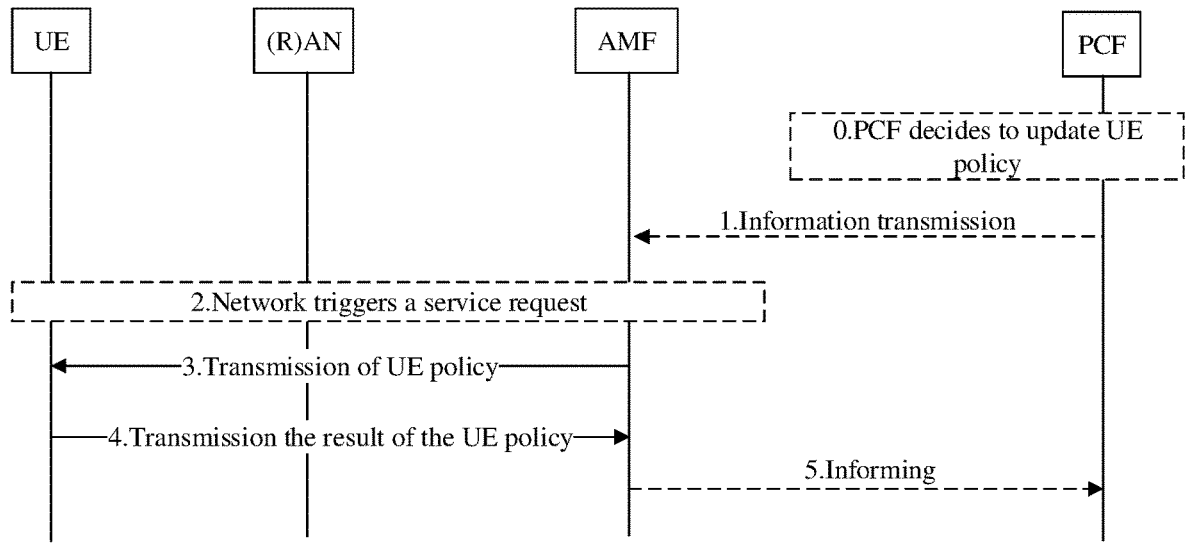
FIG. 4 is a third schematic flow chart of a policy configuration method provided by an implementation of the present disclosure.

The UE policy can be sent by a core network element (such as a PCF) to the UE through a way of a Container. When the core network element does not send the UE policy or according to a configuration of the UE, the UE can also choose to use a locally configured UE policy. In the above, the UE Policy configuration method can be as shown in FIG. 4. In the UE policy, through a UE Configuration Update (UCU) process defined by the 3GPP, a PCF puts the UE policy to be updated into a Container and sends the Container to an AMF, and the AMF forwards the Container to the UE using a Non-Access Stratum (NAS) message.

In the above, the policy identifier may be a Policy Section Identifier (PSI).

Specifically, the UE policy is divided into one or more Sections, and each section corresponding to one identifier i.e., Policy Section Identifier (PSI) is sent to the UE. The PSI is also referred to as UPSI (User Policy Section Identifier). When performing the process of network configuration for UE policy as shown in FIG. 4, the network side can divide the UE policy into multiple sections and send them to the UE in one or more NAS messages. Each section is identified by one PSI, wherein each PSI consists of a PLMN ID and a PSC (Policy Section Code). The Policy Section Code in the PSI can be unique in the PLMN network corresponding to the PLMN ID in the PSI. A different UE can have a different corresponding relationship between PSI and policy content.

According to FIG. 4, firstly, the PCF performs Act 0 to decide to update the UE policy, and then the PCF triggers a configuration of UE policy by Acts 1 to 3, wherein the UE policy to be configured can be divided into multiple sections, and each section has a PSI identifier. The UE can feed back a configuration result by Acts 4 to 5, and the description of the configuration result is also based on different PSC granularities in the PLMN (which can also be regarded as a feedback based on PSI granularities). The feedback content may include whether the UE policy delivered by the PCF is successfully configured, and so on.

When the terminal registers in a network, a stored PSI can be carried in an initial registration message to obtain the latest UE policy, and the terminal can use the UE policy contents corresponding to a PLMN of the registered network or a PLMN equivalent to the PLMN of the registered network. Therefore, the current UE policy corresponds to different PLMNs, and is used by the UE according to a UE policy corresponding to at least one of the registered PLMN, its equivalent PLMN and a PLMN of a home location.

One possible deployment form is a Non-Public Network (NPN), that is, to serves some specific users by an operator's private network or a third party's own networking. Different from the PLMN network, in the NPN network, the access of specific users will be restricted, and interoperability behaviors between the NPN network and the PLMN network will be restricted (for example, a terminal cannot switch to or reselect its cell to the PLMN network from the NPN network). The NPN network (especially an independent NPN network) itself has a strong independence, so it may need to use different UE policies on different NPN networks.

NPN networks are further divided into Stand-alone NPNs (i.e., SNPN) and Public network integrated NPNs, which are also called as Closed Access Group (CAG) networks, and definitions of the Stand-alone NPN and the Public network integrated NPN are described in 3GPP TS 23.501. Generally, a SNPN network is maintained by a non-public network operator and does not depend on functions provided by a PLMN network. A CAG network is generally a non-public network deployed in a PLMN network.

In general, SNPN network is more closed. For example, a SNPN may not support interoperations directly connected with a PLMN network (such as the UE cannot switch to or reselect its cell to the PLMN network from the SNPN network), while a CAG network can support interoperability with a PLMN network in some cases.

In a NPN network, NPN identifiers can be distinguished by PLMN ID+NID or PLMN ID+CAG ID, while PLMN IDs of different NPN networks may be identical. Herein, the NID is a Network Identifier. Therefore, the existing UE policy mechanism needs to be extended to distinguish which UE policies correspond to which NPN networks.

In the present implementation, different UE policies are identified by containing an identifier of a non-public network in the policy identifier of each UE policy. In addition, the policy identifier of the UE policy further contains a PLMN ID and/or a PSC.

In an example, the PLMN ID+NID or CAG ID is introduced to identify different UE policies. That is, PSI=PLMN ID+NID/CAG ID+PSC (PSI=PLMN ID+NID+PSC, or PSI=PLMN ID+CAG ID+PSC). In this way, whether the UE policy is used for a specific NPN network or CAG network can be distinguished by addition of the NID/CAG ID. In the above, "/" means a relationship of "or".

The network equipment, such as the PCF, can directly deliver to the terminal equipment the UE policy containing the identifier of the non-public network (at this time, the terminal equipment does not need to indicate whether it supports the PSI corresponding to the non-public network). After the terminal equipment receives the UE policy sent by the network equipment, the method further includes:

the terminal equipment determines whether the UE policy is supported or whether the policy identifier of the UE policy is identifiable;

if the UE policy is supported or the policy identifier of the UE policy is identifiable, the terminal equipment stores the UE policy and uses the UE policy when the terminal equipment registers in a corresponding non-public network.

That is to say, the terminal equipment can determine whether it supports the UE policy according to a PSI of the UE policy. Specifically, the terminal equipment determines whether it supports the corresponding UE according to the identifier of the non-public network, i.e., NID or CAG ID in the UE policy; or, if the terminal equipment is an equipment capable of accessing a non-public network, the terminal equipment is capable of identifying the policy identifier of the UE policy, which is specifically, capable of identifying the identifier of the non-public network corresponding to the PSI. In this way, the terminal equipment can save the UE policy delivered by the network equipment. Further, when the terminal equipment enters or registers in the non-public network, the UE policy corresponding to the identifier of the non-public network is used. That is, if the terminal equipment supports identifying an extended PSI, it will be used; if the terminal equipment does not support the extended PSI, the relevant PSI and its corresponding UE policy content will be ignored. The UE can also feed back a configuration result to the PCF in a UCU process, and if the extended PSI is not supported, it can be told to the PCF by the UCU process.

Considering a compatibility problem, the terminal equipment may also send a first indication to the network equipment, wherein the first indication is used for representing whether the terminal equipment supports the UE policy containing the identifier of the non-public network or whether it is needed to acquire the UE policy containing the identifier of the non-public network. Specifically, the first indication may contain an indicator bit, when the indicator is set to 1, it may indicate that the UE policy of the non-public network is supported, or it may indicate that the UE policy of the non-public network needs to be acquired; and when the indicator is set to 0, it may indicate that the UE policy of non-public network is not supported, or it is not needed to acquire the UE policy of non-public network. Of course, it can be done vice versa, which will not be repeated here.

In the above, the network equipment may be a network element (such as PCF) at the network side. Accordingly, the network equipment (such as PCF) may decide whether to deliver the UE policy of the NPN network according to the received "first indication" (for example, whether different UE policy sections can be distinguished by using the extended PSI). That is to say, the network equipment can determine whether to deliver the UE policy of the non-public network to the terminal equipment according to the indicator bit carried in the first indication.

Moreover, optionally, the network equipment may also send a third indication to the terminal equipment. Accordingly, the terminal equipment receives the third indication sent by the network equipment, wherein the third indication is used for indicating at least one non-public network sharing a UE policy corresponding to a same policy identifier. That is, with the third indication, the terminal equipment can determine which NPN networks (or CAG networks) share the UE policy corresponding to a same set of PSI. For example, among the UE policies, a UE policy with PSI=1 is a UE policy of a non-public network 1; with the third indication, it can be indicated that the UE policy with PSI=1 can also be applied to non-public networks 2, 3, and 4, therefore it is not needed for the network side to repeatedly deliver UE policies of different non-public networks for the terminal equipment, and UE policies of multiple other non-public networks can be determined by the third indication.

The method further includes:

related information of the UE policy transmitted between the terminal equipment and the network equipment is transmitted via a Container between the terminal equipment and the network equipment;

wherein the related information of the UE policy includes at least one of the following: PSI of the UE policy, first indication and third indication.

Figure 5:
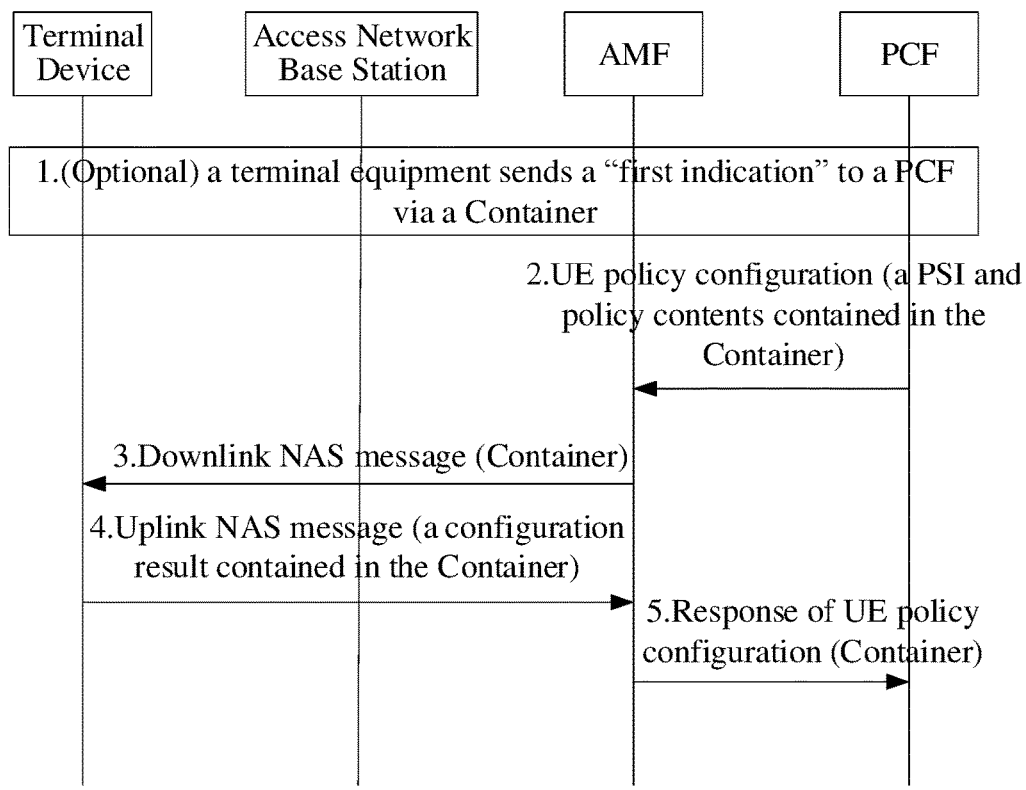
FIG. 5 is a fourth schematic flow chart of a policy configuration method provided by an implementation of the present disclosure.

For example, as shown in FIG. 5, the network equipment is a PCF, and the specific process may include:

1. a terminal equipment may send a first indication to a PCF via a Container.

2. the PCF sends a UE policy configuration to an AMF, wherein a PCI and its corresponding policy content are contained by the Container, wherein the PSI is a PSI containing an identifier of a non-public network;

3. the AMF sends the UE policy via a Container contained in a downlink NAS message;

4-5. the terminal equipment sends a configuration result via a Container contained in an uplink NAS message.

It can be seen that by adopting the above solution, the identifier of the non-public network can be contained in the policy identifier of the UE policy, such that the terminal equipment can distinguish which UE policies are for non-public networks, and thus these UE policies can be used when the UE registers in the corresponding non-public networks. In this way, the processing of configuring the UE policy corresponding to the non-public network for the terminal equipment is implemented, and it is ensured that the terminal equipment can always use correct UE policies in different types of networks.

Figure 6:
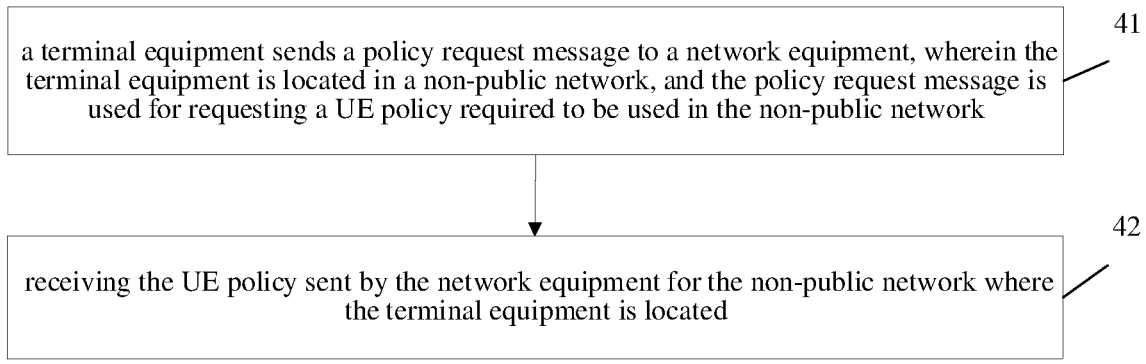
FIG. 6 is a fifth schematic flow chart of a policy configuration method provided by an implementation of the present disclosure.

As shown in FIG. 6, another policy configuration method provided by the present implementation includes acts 41-42.

Act 41: a terminal equipment sends a policy request message to a network equipment, wherein the terminal equipment is located in a non-public network, and the policy request message is used for requesting a UE policy required to be used in the non-public network; and Act 42: receiving the UE policy sent by the network equipment for the non-public network where the terminal equipment is located.

Figure 7:
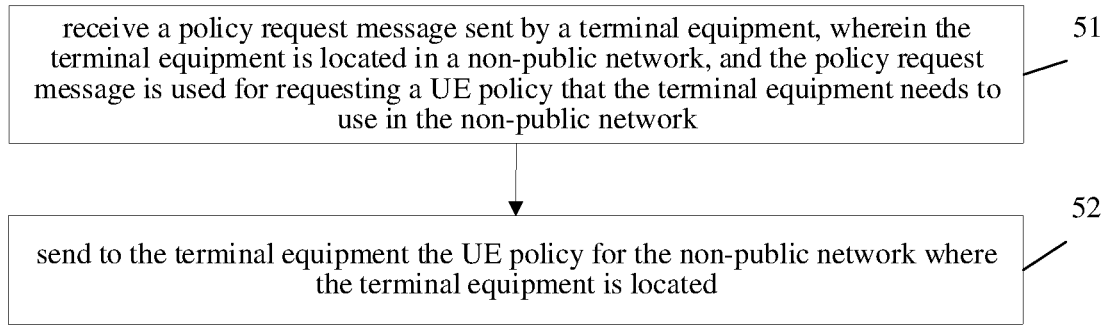
FIG. 7 is a sixth schematic flow chart of a policy configuration method provided by an implementation of the present disclosure.

Accordingly, as shown in FIG. 7, a policy configuration method includes acts 51-52.

Act 51: receiving a policy request message sent by a terminal equipment, wherein the terminal equipment is located in a non-public network, and the policy request message is used for requesting a UE policy that the terminal equipment needs to use in the non-public network; and Act 52: sending to the terminal equipment the UE policy for the non-public network where the terminal equipment is located.

The description of UE policy is the same as that in the previous implementation, and the description thereof will not be repeatedly made here.

The present implementation differs from the previous implementations in that the present implementation does not introduce a new identifier of non-public network, that is to say, an identifier of non-public network is not added into the policy identifier in the UE policy.

Instead, when the terminal equipment is moved to a non-public network (a NPN network or a CAG network), or the PLMN ID+NID or PLMN ID+CAG ID has changed, such as by switching or cell selection/reselection reaching a new NPN network, the UE actively triggers a policy request message to request a new UE policy from the network side (such as a PCF). The message contains a Container for transparent transmission of interactive messages between the UE and the PCF, and the UE policy delivered from the PCF contains a UE policy that needs to be used in the current NPN network. In this way, whenever the UE is moved to a new NPN network, it will obtain a latest UE policy corresponding to the current NPN network, does not need to support distinguishing an extended PSI identifier.

In addition, the PCF may further contain a fourth indication while delivering the policy containing the UE policy, wherein the fourth indication is used for indicating that the UE policy is used for a NPN network.

Further, the policy request message is carried and transmitted by a Container;

wherein the policy request message may include an identifier of a non-public network where the terminal equipment is located and/or a second indication for delivering to the terminal equipment a UE policy for the non-public network.

For example, the policy request message may only contain the identifier of the non-public network, and at this time, the network equipment may determine which non-public network the terminal equipment is located in according to the non-public network, and then deliver the corresponding UE policy to the UE; or, the policy request message may only contain a second indication for delivering the UE policy of the non-public network where the terminal equipment is located, and the network equipment can determine whether to deliver the UE policy to the terminal equipment according to the second indication. For example, when the indication is set to 1, it can be determined to send the UE policy of the corresponding non-public network to the terminal equipment, otherwise the UE policy will not be sent. When the identifier of the non-public network and the second indication are used in combination, it can be understood that the terminal equipment indicates which non-public network it is currently located in, and then informs the network equipment whether the terminal equipment needs to acquire the UE policy of the non-public network through the second indication. Accordingly, the network equipment can determine whether to deliver the UE policy of the non-public network to the terminal equipment according to the message.

The policy request message may be a new NAS message, for example, a Message Type parameter of the NAS message is a new value; an existing NAS message may also be used, such as an existing Registration Request message, and optionally a new Registration Type value is added to the registration request message for this purpose. The above NAS message contains a Container used for a transparent transmission of the related information of UE policy between the UE and the PCF, which may specifically contain a current network identifier (such as a NPN identifier, "second indication", etc.).

Figure 8:
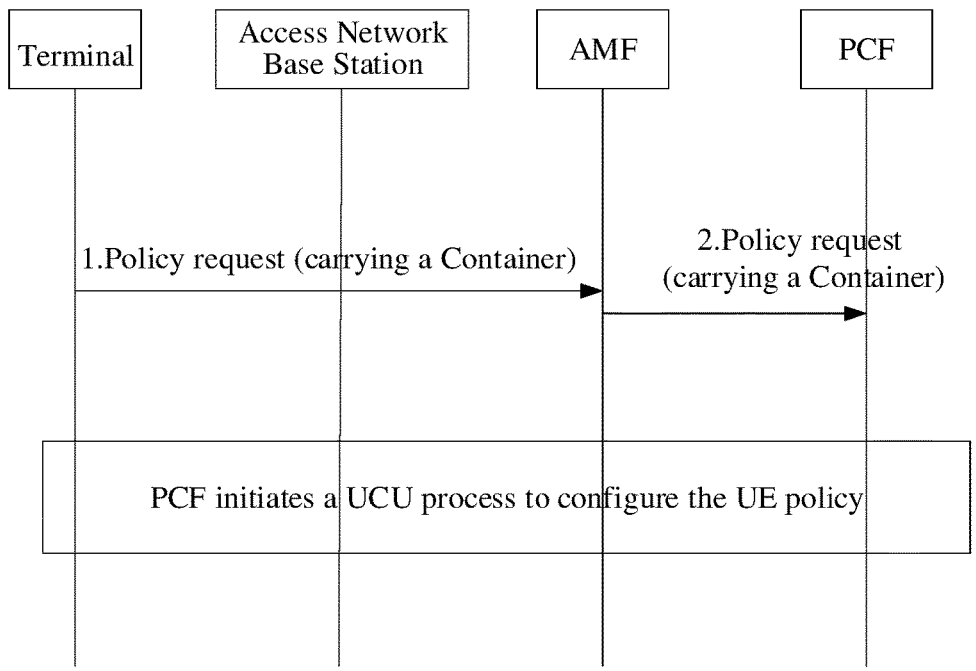
FIG. 8 is a seventh schematic flow chart of a policy configuration method provided by an implementation of the present disclosure.

Related parameter interactions of UE policies between the terminal equipment and the network equipment are all implemented by the Container. For example, referring to FIG. 8, specifically, the Container is carried in an uplink NAS message.

The terminal equipment sends the uplink NAS message carrying the Container to a first network equipment, and transfers the uplink NAS message to a second network equipment by a first network equipment. Moreover, the terminal equipment receives the Container carried in a downlink NAS message sent by the first network equipment, and the Container is sent by the second network equipment to the first network equipment.

Accordingly, when the network equipment is the second network equipment, it receives the Container sent by the first network equipment, wherein the Container is sent by the terminal equipment to the first network equipment through the uplink NAS message carrying the Container. Moreover, the method may also include sending the Container to the first network equipment, wherein the Container is carried in the downlink NAS message by the first network equipment and sent to the terminal equipment.

In the above, the first network equipment is an AMF and the second network equipment is a PCF.

That is to say, the Container is carried in the uplink NAS message, and the AMF receives the Container in the NAS message and transfers it to PCF, or the PCF sends the Container to the AMF, and the AMF carries it in the downlink NAS message and sends it to terminal equipment.

It can be seen that by adopting the above solution, when the terminal equipment is in the non-public network, the terminal equipment can directly request a UE policy from the network equipment, so as to obtain the UE policy corresponding to the non-public network where the terminal equipment is located. In this way, the processing of configuring the UE policy corresponding to the non-public network for the terminal equipment is implemented, and it is ensured that the terminal equipment can always use correct UE policies in different types of networks.

Figure 9:
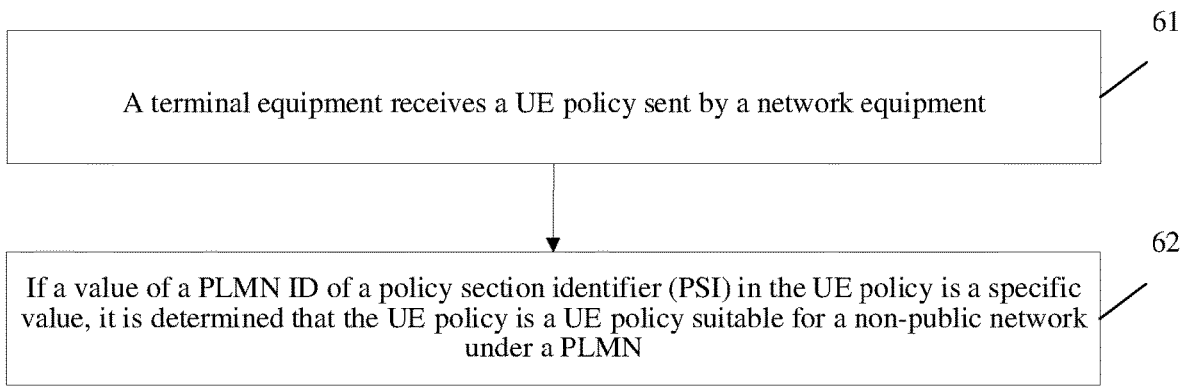
FIG. 9 is an eighth schematic flow chart of a policy configuration method provided by an implementation of the present disclosure.

As shown in FIG. 9, another policy configuration method provided by the present implementation includes acts 61-62.

Act 61: a terminal equipment receives a UE policy sent by a network equipment; and Act 62: if a value of a PLMN ID of a policy section identifier (PSI) in the UE policy is a specific value, it is determined that the UE policy is a UE policy suitable for a non-public network under a PLMN.

Figure 10:
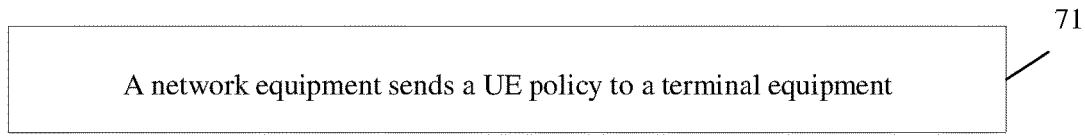
FIG. 10 is a ninth schematic flow chart of a policy configuration method provided by an implementation of the present disclosure.

Accordingly, as shown in FIG. 10, a policy configuration method includes the act 71.

Act 71: a network equipment sends a UE policy to a terminal equipment;

wherein the UE policy is a UE policy suitable for a non-public network under a PLMN when a value of a PLMN ID of a PSI in the UE policy is a specific value.

The description of the UE policy is the same as that in the previous implementations, and the description thereof will not be repeatedly made here.

That is to say, the terminal equipment decides use of the UE policy according to the value of the PLMN ID. In the above, the PLMN ID consists of a Mobile Country Code (MCC) and a Mobile Network Code (MNC), wherein the MCC generally consists of 3 decimal digits, and the MNC generally consists of 2 to 3 decimal digits.

In an example, the PLMN ID is a first value, wherein the first value can be set according to the actual situation, for example, set to be 1.

It should be indicated that the UE policy contains policy content and a policy identifier, e.g., a PSI.

That is, after receiving the UE policy, the terminal equipment determines whether the UE policy is suitable for all SNPN and/or CAG networks under the PLMN according to the PSI of the UE policy, such as a PLMN ID, that is, NID and CAG ID identifiers do not need to be identified and considered.

For example, when the terminal equipment receives a UE policy corresponding to PLMN ID=460001 and the UE resides in a CAG network, if the PLMN ID=460001, the UE can apply the UE policy with PLMN ID=460001 without considering (or ignoring) the value of the CAG ID of the current network.

In another example, the mobile country code identified by the PLMN is a second value, wherein the second value can be set according to the actual situation, for example, set to be 999.

That is to say, if a specific value of a PLMN ID in a PSI is received, a policy corresponding to the PSI is applied to all SNPN and/or CAG networks with the PLMN ID value. For example, when a value of MCC of a PLMN ID corresponding to the UE policy received by the terminal is 999, the terminal applies its corresponding UE policy to some or all NPN networks (including SNPN and/or CAG networks). Which NPN networks the UE policy is specifically applied to can be implemented by a local configuration of the UE or by an indication from the network side.

It should also be indicated that the above multiple implementations can be used in scenarios where UE policies cannot be identified by PLMN IDs. It is not limited to adding a NID or CAG ID into a PSI, while it is also feasible to consider adding other identifiers related to private networks to indicate which network the UE policy is to be used for.

The UE policy can be used in combination with network solutions of vertical industries such as URLLC (Ultra-Reliable and Low Latency Communication) and TSN (Time Sensitive Network). For example, in a specific private network, the network sends a URSP policy to the UE for binding redundant transmission data to different sessions to achieve a transmission with high reliability.

In addition, this solution can be used for delivering UE policies in a 4G network. In this case, the AMF corresponds to a MME (Mobility Management Entity) and the PCF corresponds to a PCRF (Policy and Charging Rule Function).

It can be seen that by adopting the above solution, it can be determined at the terminal equipment whether the UE policy is a UE policy suitable for the non-public network under the PLMN according to whether the PLMN ID contained in the PSI in the policy is a specific value. In this way, the processing of configuring the UE policy corresponding to the non-public network for the terminal equipment is implemented, and it can be ensured that the terminal equipment can always use correct UE policies in different types of networks.

As shown in FIG. 11, an implementation of the present disclosure provides a terminal equipment, including: a first communication unit 81 configured to receive a User Equipment (UE) policy sent by a network equipment, wherein the UE policy is used when the terminal equipment registers in a non-public network;

wherein a policy identifier of the UE policy contains an identifier of the non-public network.

Accordingly, as shown in FIG. 12, the present implementation further provides a network equipment, including: a second communication unit 91 configured to send a User Equipment (UE) policy to the terminal equipment, wherein the UE policy is used when the terminal equipment registers in a non-public network;

wherein a policy identifier of the UE policy contains an identifier of the non-public network.

Here, the network equipment may be a core network equipment at the network side, for example, a PCF.

In the present implementation, the UE policy may include an ANDSP policy, an URSP policy, and/or a V2X policy.

In the above, the policy identifier may be a Policy Section Identifier (PSI).

The Policy Section Code (PSC) in the PSI can be unique in the PLMN network corresponding to the PLMN ID in the PSI. A different UE can have a different corresponding relationship between PSI and policy content thereof.

In the present implementation, different UE policies are identified by containing an identifier of a non-public network in the policy identifier of each UE policy. In addition, the policy identifier of the UE policy further contains a PLMN ID and/or a PSC.

In an example, a PLMN ID+NID or CAG ID is introduced to identify different UE policies. That is, PSI=PLMN ID+NID/CAG ID+PSC, which can be PSI=PLMN ID+NID+PSC or PSI=PLMN ID+CAG ID+PSC. In this way, whether the UE policy is used for a specific NPN network or CAG network can be distinguished by addition of the NID/CAG ID. In the above, "/" means a relationship of "or".

The network equipment, such as the PCF, can directly deliver to the terminal equipment the UE policy containing the identifier of the non-public network (at this time, the terminal equipment does not need to indicate whether it supports the PSI corresponding to the non-public network). The terminal equipment further includes:

a first processing unit 82 configured to determine whether the UE policy is supported or whether the policy identifier of the UE policy is identifiable; wherein if the UE policy is supported or the policy identifier of the UE policy is identifiable, the terminal equipment stores the UE policy and uses the UE policy when the terminal equipment registers in a corresponding non-public network.

That is to say, the first processing unit 82 can determine whether the terminal equipment supports the UE policy according to the PSI of the UE policy. Specifically, the terminal equipment determines whether it supports the corresponding UE according to the identifier of the non-public network, i.e., NID or CAG ID in the UE policy; or, if the terminal equipment is an equipment capable of accessing a non-public network, the terminal equipment can identify the policy identifier of the UE policy, which is specifically an identifier capable of identifying the non-public network corresponding to the PSI. In this way, the terminal equipment can save the UE policy delivered by the network equipment. Further, when entering or registering into the non-public network, the terminal equipment can use the UE policy corresponding to the identifier of the non-public network. That is, if the terminal equipment supports identifying an extended PSI, the extended PSI will be used; if the terminal equipment does not support the extended PSI, the relevant PSI and its corresponding UE policy content will be ignored. The UE may also feed back a configuration result to the PCF in a UCU process, and if the extended PSI is not supported, UE will tell the PCF by the UCU process.

Considering a compatibility problem, or the first communication unit 81 of the terminal equipment may send a first indication to the network equipment, wherein the first indication is used for representing whether the terminal equipment supports the UE policy containing the identifier of the non-public network or whether it is needed to acquire the UE policy containing the identifier of the non-public network.

In the above, the network equipment may be a network element (such as PCF) at the network side. Accordingly, the network equipment (such as PCF) may decide whether to deliver the UE policy of the NPN network according to the received "first indication" (for example, whether different UE policy sections can be distinguished by using the extended PSI). In other words, the second communication unit of the network equipment receives the first indication sent by the terminal equipment, wherein the first indication is used for representing whether the terminal equipment supports the UE policy containing the identifier of the non-public network or whether it is needed to acquire the UE policy containing the identifier of the non-public network; and the second communication unit sends the UE policy of the non-public network to the terminal equipment when the first indication indicates that the terminal equipment supports the UE policy of the non-public network or needs to acquire the UE policy of the non-public network.

Moreover, optionally, the second communication unit 91 of the network equipment may also send a third indication to the terminal equipment. Accordingly, the first communication unit 81 of the terminal equipment receives the third indication sent by the network equipment, wherein the third indication is used for indicating at least one non-public network sharing a UE policy corresponding to a same policy identifier. That is, with the third indication, the terminal equipment determines which NPN networks (or CAG networks) share the UE policy corresponding to a same set of PSI. For example, among the UE policies, a UE policy with PSI=1 is a UE policy of a non-public network 1; with the third indication, it can be indicated that the UE policy with PSI=1 can also be applied to non-public networks 2, 3, and 4, therefore it is not necessary for the network side to repeatedly deliver UE policies of different non-public networks to the terminal equipment, and UE policies of multiple other non-public networks can be determined by the third indication.

Related information of the UE policy transmitted between the first communication unit 81 of the terminal equipment and the second communication unit 91 of the network equipment is transmitted via a Container between the terminal equipment and the network equipment;

wherein the related information of the UE policy includes at least one of the following: the PSI of the UE policy, the first indication and the third indication.

It can be seen that by adopting the above solution, the identifier of the non-public network can be contained in the policy identifier of the UE policy, such that the terminal equipment can distinguish which UE policies are for non-public networks, and thus these UE policies can be used when the UE registers in the corresponding non-public networks. In this way, the processing of configuring the UE policy corresponding to the non-public network for the terminal equipment is implemented, and it is ensured that the terminal equipment can always use correct UE policies in different types of networks.

As shown in FIG. 11, another terminal equipment provided by the present implementation includes: a first communication unit 81 configured to send a policy request message to a network equipment, wherein the terminal equipment is located in a non-public network, and the policy request message is used for requesting a UE policy required to be used in the non-public network; and receive the UE policy sent by the network equipment for the non-public network where the terminal equipment is located.

Accordingly, as shown in FIG. 12, a network equipment includes: a second communication unit 91 configured to receive a policy request message sent by a terminal equipment, wherein the terminal equipment is located in a non-public network, and the policy request message is used for requesting a UE policy required to be used by the terminal equipment in the non-public network; and send to the terminal equipment the UE policy for the non-public network where the terminal equipment is located.

The present implementation differs from the previous implementations in that the present implementation does not introduce a new identifier related to a NPN, that is, an identifier of non-public network is not added into the policy identifier in the UE policy.

Instead, when the terminal equipment is moved to a non-public network (a NPN network or a CAG network), or the PLMN ID+NID or PLMN ID+CAG ID has changed, such as reaching a new NPN network by switching or cell selection/reselection, the UE actively triggers a policy request message to request a new UE policy from the network side (such as a PCF). The message contains a Container for transparent transmission of interactive messages between the UE and the PCF, and the UE policy delivered from the PCF contains a UE policy that needs to be used in the current NPN network. In this way, whenever the UE is moved to a new NPN network, it will obtain a latest UE policy corresponding to the current NPN network, no need to support distinguishing an extended PSI identifier.

In addition, the second communication unit 91 of the network equipment, i.e. the PCF, may further contain a fourth indication while delivering the policy containing the UE, wherein the fourth indication is used for indicating that the UE policy is used for a NPN network.

Further, the policy request message is carried and transmitted by a Container;

wherein the policy request message may include an identifier of a non-public network where the terminal equipment is located and/or a second indication for delivering to the terminal equipment a UE policy for the non-public network.

The policy request message may be a new NAS message, for example, a Message Type parameter of the NAS message is a new value; or the policy request message is an existing NAS message, such as an existing Registration Request message, and optionally a new Registration Type value is added into the registration request message for this purpose. The above NAS message contains a Container used for a transparent transmission of the related information of UE policy between the UE and the PCF, which may specifically contain a current network identifier (such as a NPN identifier, "second indication", etc.).

The first communication unit 81 of the terminal equipment sends an uplink NAS message carrying the Container to the first network equipment, and transfers it to the second network equipment through a first network equipment. Moreover, the terminal equipment receives the Container carried in a downlink NAS message sent by the first network equipment, and the Container is sent by the second network equipment to the first network equipment.

Accordingly, when the network equipment is a second network equipment, the second communication unit 91 receives the Container sent by the first network equipment, wherein the Container is sent by the terminal equipment to the first network equipment through the uplink NAS message carrying the Container. Moreover, sending the Container to the first network equipment may or be included, wherein the Container is carried in a downlink NAS message by the first network equipment and sent to the terminal equipment.

In the above, the first network equipment is an AMF and the second network equipment is a PCF.

It can be seen that by adopting the above solution, when the terminal equipment is in the non-public network, the terminal equipment can directly request a UE policy from the network equipment, so as to obtain the UE policy corresponding to the non-public network where the terminal equipment is located. In this way, the processing of configuring the UE policy corresponding to the non-public network for the terminal equipment is implemented, and it is ensured that the terminal equipment can always use correct UE policies in different types of networks.

As shown in FIG. 11, another terminal equipment provided by the present implementation includes: a first communication unit 81, configured for a terminal equipment to receive a UE policy sent by a network equipment; and a first processing unit 82 configured to determine that the UE policy is a UE policy suitable for a non-public network under a PLMN if a value of a PLMN ID of the policy identifier (PSI) in the UE policy is a specific value.

Accordingly, as shown in FIG. 12, a network equipment includes: a second communication unit 91 configured to send a UE policy to a terminal equipment;

wherein when a value of the PLMN ID of the PSI in the UE policy takes a specific value, the UE policy is a UE policy suitable for the non-public network under the PLMN.

The description of UE policy is the same as that in the previous implementations, and the description thereof will not be repeatedly made here.

That is to say, the terminal equipment decides use of the UE policy according to the value of the PLMN ID. Specifically, the PLMN ID consists of a Mobile Country Code (MCC) and a Mobile Network Code (MNC), wherein the MCC generally consists of 3 decimal digits, and the MNC generally consists of 2 to 3 decimal digits.

In an example, the PLMN ID is a first value, wherein the first value can be set according to the actual situation, for example, set to be 1.

It should be indicated that the UE policy contains policy content and a policy identifier, e.g., a PSI.

That is, after receiving the UE policy, the terminal equipment determines whether the UE policy is suitable for all SNPN and/or CAG networks under the PLMN according to the PSI of the UE policy, such as the PLMN ID, that is, the NID and CAG ID identifiers do not need to be identified and considered.

For example, when the terminal equipment receives a UE policy corresponding to PLMN ID=460001 and the UE resides in a CAG network, if the PLMN ID=460001, the UE can apply the UE policy with PLMN ID=460001 without considering (or ignoring) the value of the CAG ID of the current network.

In another example, the mobile country code identified by the PLMN is a second value, wherein the second value can be set according to the actual situation, for example, set to be 999.

That is to say, if a specific value of a PLMN ID in a PSI is received, a policy corresponding to the PSI is applied to all SNPN and/or CAG networks with the PLMN ID value. For example, when a value of MCC of a PLMN ID corresponding to the UE policy received by the terminal is 999, the terminal applies its corresponding UE policy to some or all NPN networks (including SNPN and/or CAG networks). Which NPN networks the UE policy is specifically applied to can be implemented by a local configuration of the UE or by an indication from the network side.

It can be seen that by adopting the above solution, it can be determined at the terminal equipment whether the UE policy is a UE policy suitable for the non-public network under the PLMN according to whether the PLMN ID contained in the PSI in the policy is a specific value. In this way, the processing of configuring the UE policy corresponding to the non-public network for the terminal equipment is implemented, and it can be ensured that the terminal equipment can always use correct UE policies in different types of networks.

As shown in FIG. 13A, an implementation of the present disclosure further provides a policy configuration method, including:

a terminal equipment receives a UE policy sent by a network equipment, wherein the UE policy is applied to a non-public network.

Moreover, as shown in FIG. 13B, a policy configuration method includes:

a network equipment sends a UE policy to a terminal equipment, wherein the UE policy is applied to a non-public network.

Figure 14A:
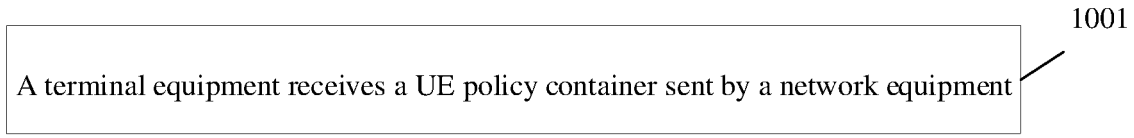
FIG. 14A is a twelfth schematic flow chart of a policy configuration method provided by an implementation of the present disclosure.

In an example, as shown in FIG. 14A, the method includes the act 1001.

Act 1001: a terminal equipment receives a UE policy container sent by a network equipment;

wherein the UE policy container contains a UE policy and a fourth indication; and the fourth indication is used for indicating a UE policy part in the UE policy, which is to be used in a non-public network.

Figure 14B:
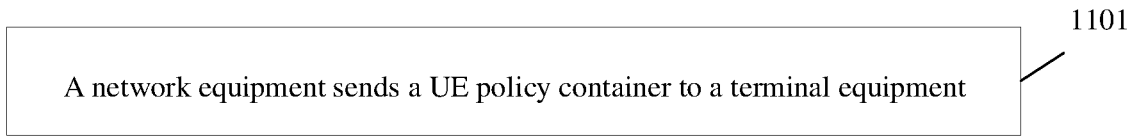
FIG. 14B is a thirteenth schematic flow chart of a policy configuration method provided by an implementation of the present disclosure.

Accordingly, as shown in FIG. 14B, a policy configuration method for a network equipment includes the act 1101.

Act 1101: a network equipment sends a UE policy container to a terminal equipment;

wherein the UE policy container contains a UE policy and a fourth indication; and the fourth indication is used for indicating a UE policy part in the UE policy, which is to be used in a non-public network.

Specifically, the network equipment can be a PCF at the network side, and the fourth indication is contained in a UE policy container delivered to the terminal equipment by the PCF.

In the above, the fourth indication includes one of the following:

an indication of a part used for the non-public network in the UE policy and/or an identifier of the non-public network corresponding to the part used for the non-public network.

A distinguishing granularity of the fourth indication is UE policy section code, UE policy section content or UE policy part.

That is, the indication information is used for indicating which part of the contents of the UE policy belongs to NPN and/or NPN identifier(s) (for example: NID or CAG ID).

Figure 15:
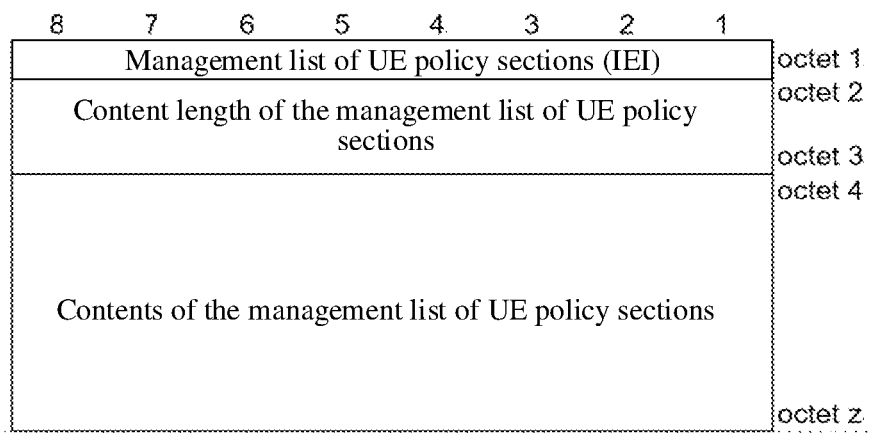
FIG. 15 to FIG. 17 are schematic diagrams of several information structures provided by implementations of the present disclosure.

For example, information elements contained in the UE policy container are shown in FIG. 15, and the fourth indication may indicate that the UE policy section contents under a UE Policy Section Code (UPSC) are used for the NPN and/or corresponding NPN identifier. For example, referring to FIG. 16, it can be indicated that which one or more of UE policy section contents under the UPSC is used for the NPN or the corresponding NPN identifier.

Figure 16A:
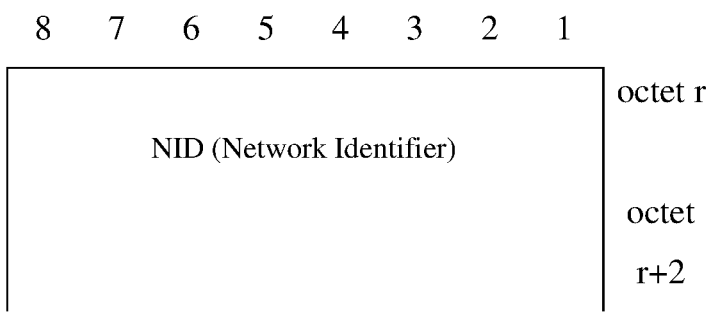
Figure 16B:
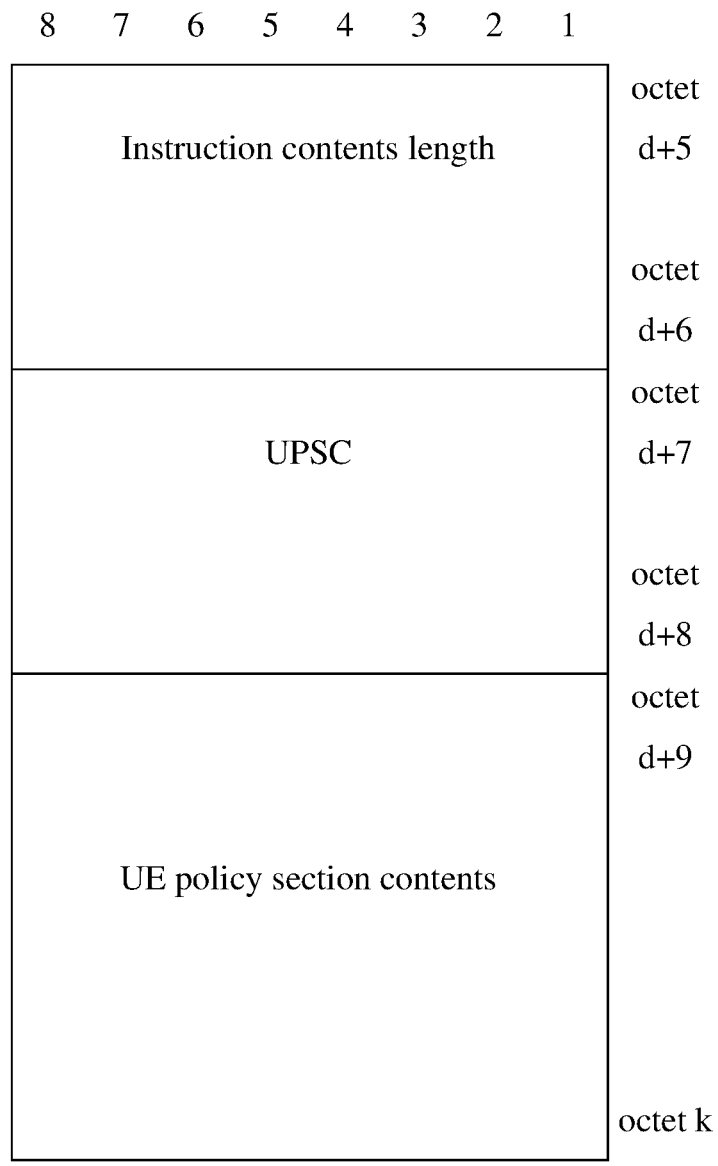

Or, the fourth indication may indicate that the UE policy content corresponding to which UE policy part is for the NPN, and/or the corresponding NPN identifier. For example, the fourth indication may indicate that the policy contents corresponding to which one or more of the UE policy parts in FIG. 16A and FIG. 16B are applied to the NPN, and the corresponding NPN identifier (NID) may be indicated by a separate table.

Figure 17:
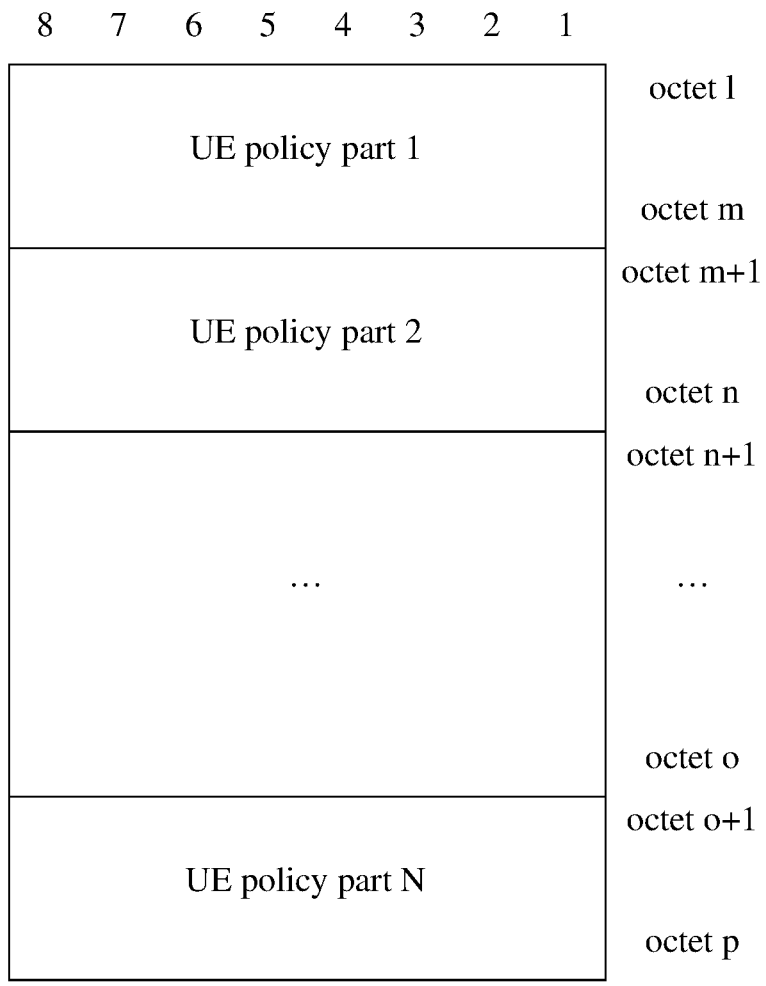
Figures 19, 20, 21:
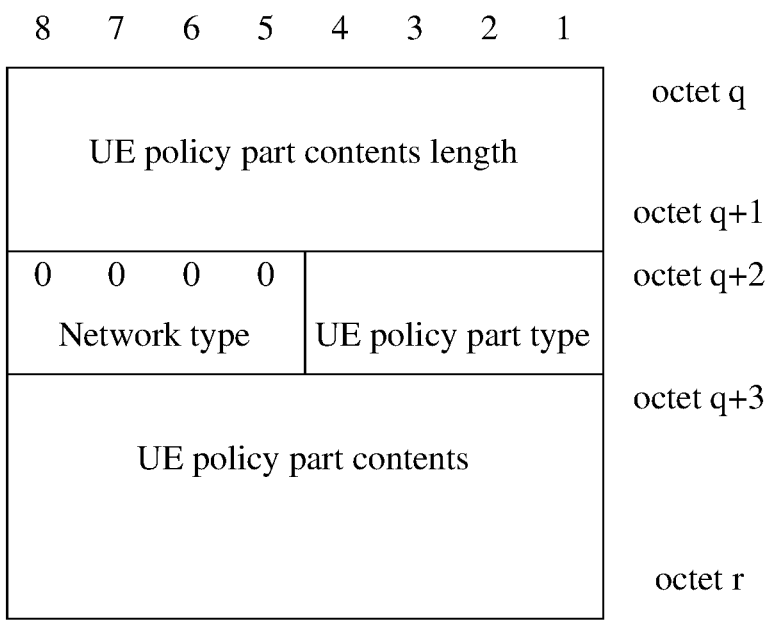
FIG. 19 is a fifteenth schematic flow chart of a policy configuration method provided by an implementation of the present disclosure.
FIG. 20 is a sixteenth schematic flow chart of a policy configuration method provided by an implementation of the present disclosure.
FIG. 21 to FIG. 23 are schematic diagrams of other information structures provided by implementations of the present disclosure.

Further, reference may be made to FIG. 17 and FIG. 21 for specific information about the UE policy part, which indicates a content length of the UE policy part, network type, type of the UE policy part and content of the UE policy part.

Figure 18:
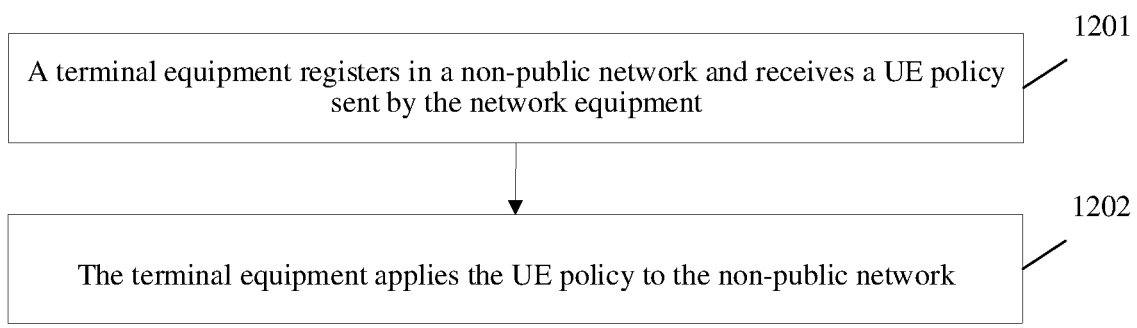
FIG. 18 is a fourteenth schematic flow chart of a policy configuration method provided by an implementation of the present disclosure.

As shown in FIG. 18, another example provides a policy configuration method provided, including acts 1201-1202.

Act 1201: a terminal equipment receives a UE policy sent by the network equipment while registered to the non-public network;

Act 1202: the terminal equipment applies the UE policy only to the non-public network.

In the present implementation, the network equipment can be a PCF, that is to say, parameters of a UE policy container which is delivered from the network equipment and received by the terminal equipment do not change.

Further, the terminal equipment may store the UE policy in association with an identifier of the non-public network (such as PLMN ID+NID) after receiving the UE policy sent by the network equipment. That is to say, the UE policy obtained by the UE when registering in an NPN is considered (by default) by the UE as being only suitable for the NPN network, and the received UE policy is stored with the identifier of the NPN.

In addition, under a condition that the terminal equipment is moved out of the non-public network, the UE policy can be deleted or kept saved.

For example, in a case that the terminal equipment is moved from NPN-1 to other PLMN or NPN, this policy will not be used, for example:

In a mode, the UE obtains a UE policy in the NPN-1 but may still store the UE policy previously obtained in the NPN-1. The UE may report the stored UE policy identifier in a registration request message when returning to the NPN-1. The reported UE policy identifier can still be in the form of PLMN ID+PSC, because it will only be used in the NPN-1, thus no conflict will be caused.

In another mode, after the UE leaves the NPN-1, the UE policy corresponding to the NPN-1 can be cleared. In this way, when the UE registers in the NPN-1 again, it will not carry a UE policy identifier, and the network equipment will deliver again a corresponding UE policy for the terminal equipment.

In the present implementation, the NPN (non-public network) can be a SNPN network or a CAG network.

In another example, as shown in FIG. 19, a policy configuration method is provided, including the act 1301.

Act 1301: a terminal equipment carries a fifth indication in a container of a registration request message, wherein the fifth indication is used for indicating a network type registered by the terminal equipment, and the network type includes non-public network or public network.

Further, the method may also include: the terminal equipment receives a UE policy corresponding to the network type.

Accordingly, as shown in FIG. 20, a policy configuration method for a network equipment includes:

Act 1401: a network equipment receives a fifth indication carried in a container of a registration request message sent by a terminal equipment, wherein the fifth indication is used for indicating a network type registered by the terminal equipment, and the network type includes non-public network or public network.

Further, or the method may include: the network equipment sends the UE policy to the terminal equipment according to the network type.

The solution provided by the present implementation can be used in combination with the aforementioned two solutions.

The network equipment may further send to the terminal equipment a policy identifier of the UE policy equipment as a PSI.

In the above, the PSI is a PSI corresponding to the UE policy used in the NPN network. The NPN can be a SNPN or a CAG.

That is to say, the terminal equipment may carry "indication information", i.e., the fifth indication, in the Container in the registration request message, wherein the fifth indication is used for indicating a network type in which the UE registers, such as indicating registering in an NPN network or registering in a PLMN network.

Figure 22:
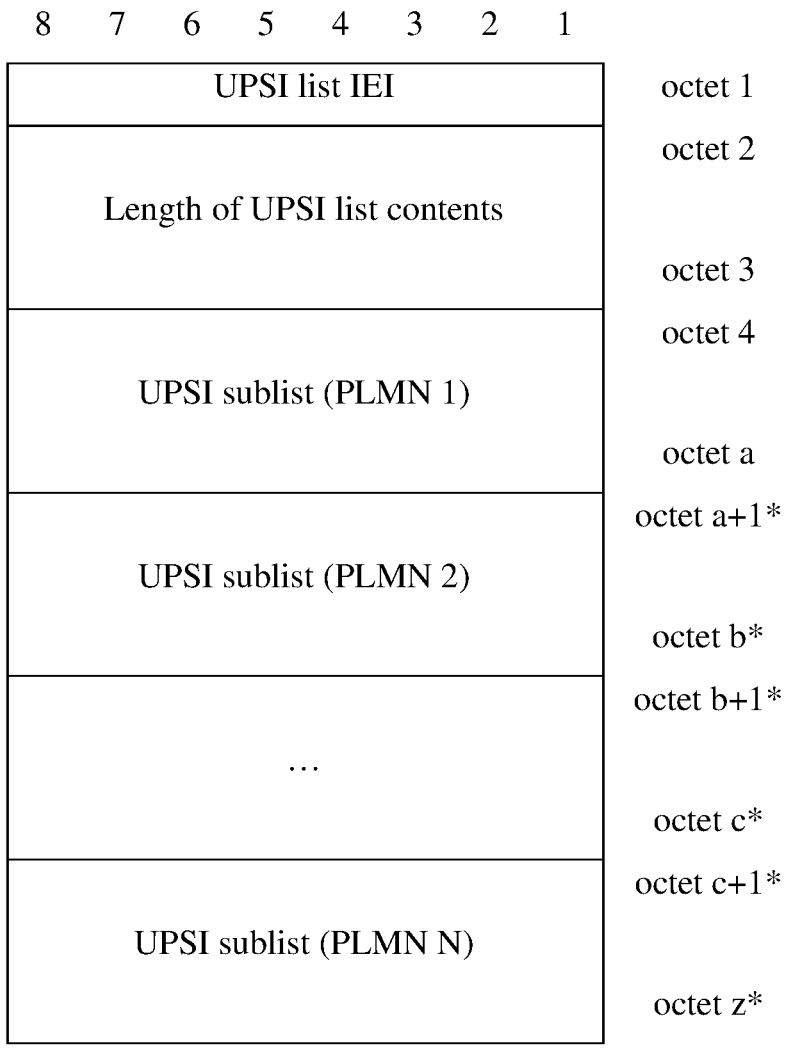

A Container of a UE registration message may or may not carry a PSI list. The PSI list may be as shown in FIG. 22, and a UPSI sub-list may be contained in information elements of the UPSI list to indicate the UPSI of the corresponding network.

Figure 23:
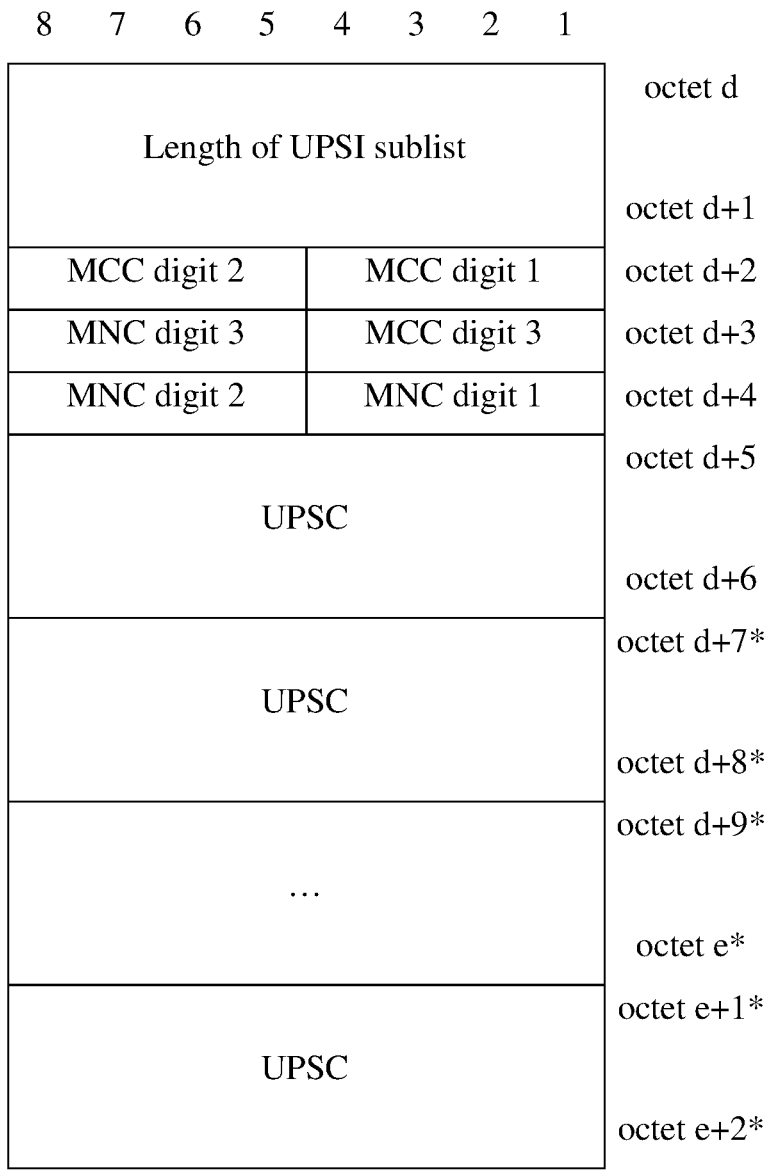

In addition, it can be limited that when the UE adds an extended PSI (PLMN ID+NID+PSC) in the Container, the extended PSI is reported only when a registration in a SNPN network is initiated. In addition, the network side may only deliver the extended PSI when the UE is in the SNPN network. For example, the contents in the UPSI sub-list in FIG. 23 contain a length of the UPSI sub-list and a UPSC, i.e, a UE policy Section Code. As shown in FIG. 16A, it indicates that the unextended PSI still used in a delivered UE policy is added therein. The UE can also report the unextended PSI (PLMN ID+PSC), because the corresponding policy and policy identifier will be used only in the NPN network, so there will be no conflict in such use.

An implementation of the present disclosure further provides a terminal equipment, including:

A first communication unit configured to receive a UE policy sent by a network equipment, wherein the UE policy is applied to a non-public network.

Moreover, a network equipment includes:

a second communication unit configured to send a UE policy to a terminal equipment, wherein the UE policy is applied to a non-public network.

In a specific example, there is provided a terminal equipment, including:

a first communication unit configured to receive a UE policy container sent by a network equipment;

wherein the UE policy container contains a UE policy and a fourth indication; and the fourth indication is used for indicating a UE policy part in the UE policy, which is to be used in a non-public network.

Accordingly, a network equipment includes: a second communication unit configured to send a UE policy container to a terminal equipment;

wherein the UE policy container contains a UE policy and a fourth indication; and the fourth indication is used for indicating a UE policy part in the UE policy, which is to be used in a non-public network.

Specifically, the network equipment can be a PCF at the network side, and the fourth indication is included in a UE policy container delivered to the terminal equipment by the PCF.

In the above, the fourth indication includes one of the following:

an indication of a part in the UE policy used for the non-public network and/or an identifier of the non-public network corresponding to the part for the non-public network.

A distinguishing granularity of the fourth indication is a UE policy section code, or a UE policy section content.

A terminal equipment provided in another example, includes:

a first communication unit configured to receive a UE policy sent by a network equipment while registered to the non-public network; and a first processing unit configured to apply the UE policy to the non-public network.

In the present implementation, the network equipment can be a PCF, and the contents in a UE policy container which is delivered from the network equipment and received by the terminal equipment do not change.

A first processing unit configured to stores, as soon as reception of the UE policy sent by the network equipment, the UE policy in association with an identifier of the non-public network.

A terminal equipment provided in another example includes:

a first communication unit configured to carry a fifth indication in a container of a registration request message, wherein the fifth indication is used for indicating a network type registered by the terminal equipment, and the network type includes non-public network or public network; and receive a UE policy corresponding to the network type.

Accordingly, the network equipment includes: a second communication unit configured to receive the fifth indication carried in the container of a registration request message sent by the terminal equipment, wherein the fifth indication is used for indicating the network type registered by the terminal equipment, and the network type includes non-public network or public network; and send the UE policy to the terminal equipment according to the network type.

The policy identifier of the UE policy sent by the network equipment to the terminal equipment is PSI.

In the above, the PSI is a PSI corresponding to the UE policy used in the NPN network. The NPN can be a SNPN or a CAG.

Figure 24:
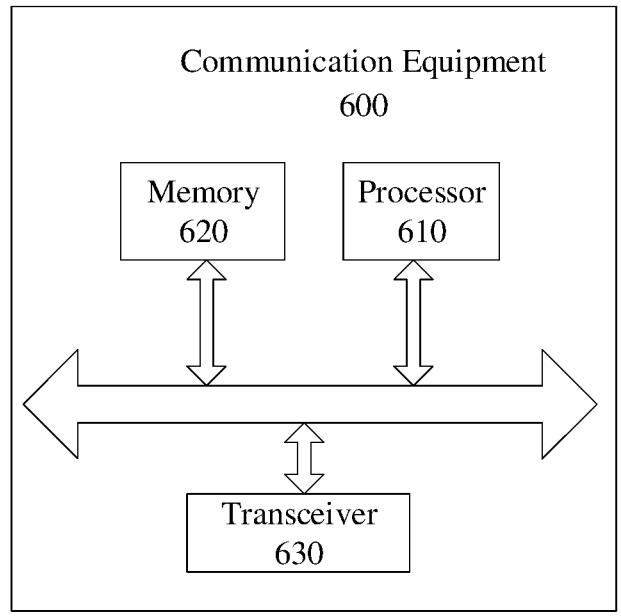
FIG. 24 is a schematic diagram of structural composition of a communication equipment provided by an implementation of the present disclosure.

FIG. 24 is a schematic structural diagram of a communication equipment 600 provided by an implementation of the present disclosure, wherein the communication equipment in the present implementation can be specifically a network equipment or a terminal equipment in the previous implementations. The communication equipment 600 shown in FIG. 24 includes a processor 610, wherein the processor 610 may call and run a computer program from a memory to implement the method in an implementation of the present disclosure.

Optionally, as shown in FIG. 24, the communication equipment 600 may further include a memory 620. In the above, the processor 610 may call and run a computer program from the memory 620 to implement the method in an implementation of the present disclosure.

In the above, the memory 620 may be a separate device independent of the processor 610 or may be integrated in the processor 610.

Optionally, as shown in FIG. 24, the communication equipment 600 may further include a transceiver 630, and the processor 610 may control the transceiver 630 to communicate with other equipment. Specifically, the transceiver 630 may send information or data to other equipment or receive information or data sent by other equipment.

In the above, the transceiver 630 may include a transmitter and a receiver. The transceiver 630 may further include antennas, and the number of the antennas may be one or more.

Optionally, the communication equipment 600 may specifically be a network equipment of an implementation of the present disclosure, and the terminal equipment 600 may implement the corresponding processes implemented by the network equipment in various methods of the implementation of the present disclosure, which will not be repeated here for sake of brevity.

Optionally, the communication equipment 600 may specifically be a terminal equipment or network equipment of an implementation of the present disclosure, and the communication equipment 600 may implement the corresponding processes implemented by the mobile terminal/terminal equipment in various methods of the implementation of the present disclosure, which will not be repeated here for sake of brevity.

Figure 25:
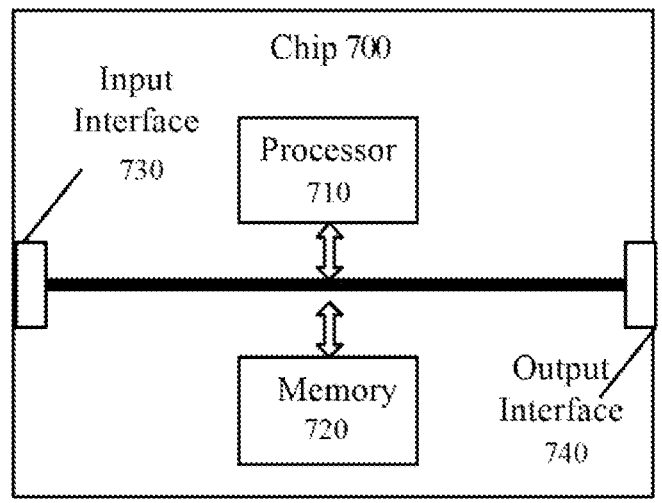
FIG. 25 is a schematic block diagram of a chip provided by an implementation of the present application.

FIG. 25 is a schematic structural diagram of a chip of an implementation of the present disclosure. A chip 700 shown in FIG. 25 includes a processor 710, wherein the processor 710 may call and run a computer program from a memory to implement the method in an implementation of the present disclosure.

Optionally, as shown in FIG. 25, the chip 700 may further include a memory 720. In the above, the processor 710 may call and run a computer program from the memory 720 to implement the method in an implementation of the present disclosure.

In the above, the memory 720 may be a separate device independent of the processor 710 or may be integrated in the processor 710.

Optionally, the chip 700 may further include an input interface 730. In the above, the processor 710 may control the input interface 730 to communicate with other equipment or chips. Specifically, the processor 710 may acquire information or data sent by other equipment or chips.

Optionally, the chip 700 may further include an output interface 740. In the above, the processor 710 may control the output interface 740 to communicate with other equipment or chips. Specifically, the processor may output information or data to other equipment or chips.

Optionally, the chip may be applied in a network equipment of an implementation of the present application, and the chip may implement the corresponding processes implemented by the terminal equipment in various methods of the implementation of the present disclosure, which will not be repeated here for sake of brevity.

It should be understood that the chip mentioned in the implementation of the present disclosure may be referred to as a system-level chip, a system chip, a chip system or a system-on-chip, etc.

It should be understood that, the processor in an implementation of the present disclosure may be an integrated circuit chip having a signal processing capability. In an implementation process, the acts of the above method implementations may be implemented by using an integrated logic circuit of hardware in the processor or instructions in a form of software. The above processor may be a general purpose processor, a digital signal processor (DSP), an Application Specific Integrated Circuit (ASIC), a Field Programmable Gate Array (FPGA) or another programmable logic device, a discrete gate or a transistor logic device, or a discrete hardware component. The processor may implement or perform the disclosed methods, acts and logical block diagrams in the implementations of the present disclosure. The general purpose processor may be a microprocessor, or the processor may be any conventional processor or the like. The acts of the method disclosed in connection with the implementations of the present disclosure may be directly embodied in the execution of a hardware decoding processor or in the execution by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It should be understood that the memory in an implementation of the present disclosure may be a volatile memory or a non-volatile memory, or it may include both volatile and non-volatile memory. In the above, the non-volatile memory may be a Read-Only Memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. As an exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct Rambus dynamic random access memory (Direct Rambus RAM, DR RAM). It should be noted that the memory in the systems and methods described in this specification is aimed at including but being not limited to these and any other suitable types of memories.

It should be understood that, the above memory is illustrative and should not be construed as a limitative description. For example, the memory in the implementations of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synch link DRAM (SLDRAM), Direct Rambus RAM (DR RAM), or the like. That is, memories in the implementations of the present application are intended to include, but are not limited to, these and any other suitable types of memories.

Figure 26:
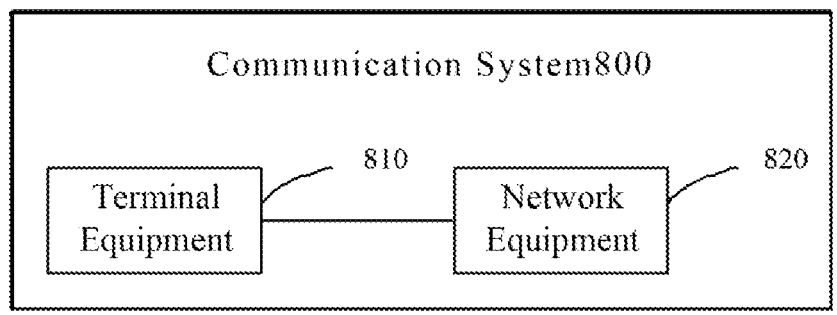
FIG. 26 is a second schematic diagram of an architecture of a communication system provided by an implementation of the present application.

FIG. 26 is a schematic block diagram of a communication system 800 provided by an implementation of the present application. As shown in FIG. 26, the communication system 800 may include a terminal equipment 810 and a network equipment 820.

In the above, the terminal equipment 810 may be configured to implement the corresponding functions implemented by a UE in the above methods, and the network equipment 820 may be configured to implement the corresponding functions implemented by the network equipment in the above methods, which will not be repeated here for sake of brevity.

An implementation of the present disclosure further provides a computer readable storage medium configured to store a computer program.

Optionally, the computer readable storage medium may be applied in a network equipment or terminal equipment in an implementation of the present disclosure, and the computer program enables a computer to perform the corresponding processes implemented by the network equipment in various methods of the implementations of the present application, which will not be repeated here for sake of brevity.

An implementation of the present disclosure further provides a computer program product including computer program instructions.

Optionally, the computer program product may be applied in a network equipment or terminal equipment in an implementation of the present disclosure, and the computer program instructions enable a computer to perform the corresponding processes implemented by the network equipment in various methods of the implementations of the present disclosure, which will not be repeated here for sake of brevity.

An implementation of the present disclosure further provides a computer program.

Optionally, the computer program may be applied in a network equipment or terminal equipment in an implementation of the present disclosure, and when the computer program is run on a computer, the computer program enables the computer to perform the corresponding processes implemented by the network equipment in various methods of the implementations of the present disclosure, which will not be repeated here for sake of brevity.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled in the art may use different methods to achieve the described functions for each particular application, but such achievement should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatus and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not performed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or various units may be physically present separately, or two or more units may be integrated in one unit.

The functions may be stored in a computer readable storage medium if achieved in a form of software functional units and sold or used as a separate product. Based on such understanding, the technical solution of the present disclosure, in essence, or the part contributing to the prior art, or the part of the technical solution, may be embodied in the form of a computer software product stored in a storage medium, including a number of instructions for enabling a computer device (which may be a personal computer, a server, or a network equipment) to perform all or part of the acts of the methods described in various implementations of the present disclosure. The foregoing storage medium includes: any medium that can store program code, such as a USB flash drive, a removable hard disk, a Read-Only Memory (ROM), a Random Access Memory (RAM), a magnetic disk, or an optical disc.

What are described above are merely exemplary implementations of the present disclosure, but the protection scope of the present disclosure is not limited thereto. Any person skilled in the art may easily conceive variations or substitutions within the technical scope disclosed by the present disclosure, which shall be included within the protection scope of the present disclosure. Therefore, the protection scope of the present disclosure should be subject to the protection scope of the claims.

What is claimed is:

1. A policy configuration method, comprising:
   receiving, by a terminal equipment, a user equipment (UE) policy sent by a network equipment, wherein the UE policy is applied to a non-public network (NPN network),
   wherein receiving by a terminal equipment, a UE policy sent by a network equipment, further comprises: receiving, by the terminal equipment, the UE policy sent by the network equipment while registered to the non-public network; and applying, by the terminal equipment, the UE policy to the non-public network,
   characterized in that, the method further comprises: carrying a Policy Section Identity (PSI) corresponding to the UE policy of the non-public network in a container of a registration request message in a case that the terminal equipment initiates a registration request in the non-public network,
   storing the UE policy in association with an identifier of the non-public network, wherein the identifier of the non-public network is Public Land Mobile Network Identifier (PLMN ID)+Network Identifier (NID).

2. The method of claim 1, wherein the UE policy received by the UE while registered to the NPN is considered by default by the UE as being only suitable for the NPN network.

3. The method of claim 1, further comprising:
   not carrying the PSI corresponding to the UE policy of the non-public network in the container of the registration request message in a case that the registration request is initiated in other networks.

4. The method of claim 3, wherein the PSI is a PSI corresponding to the UE policy used in the NPN network.

5. The method of claim 1, wherein the UE policy comprises an Access Network Discovery Selection Policy (ANDSP), a User Equipment Routing Selection Policy (URSP), a Vehicle-to-Everything (V2X) policy and a Uu interface policy.

6. The method of claim 1, wherein the NPN network is a Stand-alone NPN (SNPN).

7. The method of claim 1, wherein the PSI comprises the PLMN ID and a Policy Section Code (PSC).

8. A terminal equipment, comprising:
   a transceiver configured to receive a user equipment (UE) policy sent by a network equipment, wherein the UE policy is applied to a non-public network (NPN network),
   wherein the transceiver of the terminal equipment is configured to receive the UE policy sent by the network equipment, while registered to the non-public network;
   and wherein the terminal equipment further comprises: a processor configured to apply the UE policy to the non-public network,
   characterized in that, the transceiver is configured to carry a Policy Section Identity (PSI) corresponding to the UE policy of the non-public network in a container of a registration request message in a case that a registration request is initiated in the non-public network,
   the processor is configured to store the UE policy in association with an identifier of the non-public network, wherein the identifier of the non-public network is Public Land Mobile Network Identifier (PLMN ID)+Network Identifier (NID).

9. The terminal equipment of claim 8, wherein the UE policy received by the terminal equipment while registered to the NPN is considered by default by the UE as being only suitable for the NPN network.

10. The terminal equipment of claim 8, wherein the transceiver is configured to not carry the PSI corresponding to the UE policy of the non-public network in the container of a registration request message in a case that a registration request is initiated in other networks.

11. The terminal equipment of claim 10, wherein the PSI is a PSI corresponding to the UE policy used in the NPN network.

12. The terminal equipment of claim 8, wherein the UE policy comprises an Access Network Discovery Selection Policy (ANDSP), a User Equipment Routing Selection Policy (URSP), a Vehicle-to-Everything (V2X) policy and a Uu interface policy.

13. The terminal equipment of claim 8, wherein the NPN network is a Stand-alone NPN (SNPN).

14. A network equipment, comprising:
   a transceiver, configured to send a user equipment (UE) policy to a terminal equipment, wherein the UE policy is applied to a non-public network (NPN network),
   characterized in that, the transceiver is configured to receive a fifth indication carried in a container of a registration request message sent by the terminal equipment, wherein the fifth indication is configured to indicate a network type registered by the terminal equipment, and the network type comprises the non-public network or a public network; and send a UE policy corresponding to the network type to the terminal equipment.

the UE policy is stored in association with an identifier of the non-public network, wherein the identifier of the non-public network is Public Land Mobile Network Identifier (PLMN ID)+Network Identifier (NID).

15. The network equipment of claim 14, wherein the transceiver is configured to send the UE policy to the terminal equipment according to the network type.

16. The network equipment of claim 15, wherein the UE policy sent by the network equipment is considered by default as being only suitable for the NPN network.

17. The network equipment of claim 14, wherein a policy identifier of the UE policy sent to the terminal equipment is a Policy Section Identity (PSI).

18. The network equipment of claim 17, wherein the PSI is a PSI corresponding to the UE policy used in the NPN.

19. The network equipment of claim 14, wherein the UE policy comprises an Access Network Discovery Selection Policy (ANDSP), a User Equipment Routing Selection Policy (URSP), a Vehicle-to-Everything (V2X) policy and a Uu interface policy.

20. The network equipment of claim 14, wherein the NPN network is a Stand-alone NPN (SNPN).

* * * * *